UNITED STATES PATENT OFFICE 2,684,310

PLASTIC COATING COMPOSITION AND PLASTIC ARTICLE COATED THEREWITH

Stanley R. Prance and Harry O. Waag, Dayton, Ohio, assignors to General Motors Corporation, Detroit, Mich., a corporation of Delaware No Drawing. Application July 27, 1950, Serial No. 176,249

5 Claims. (Cl. 117—138.8)

This invention relates to coatings and is particularly concerned with plastic coatings or films used to enhance the appearance of articles made from methyl methacrylate resin.

It is therefore an object of the invention to provide an adherent, non-reactive coating which may be applied to one side of an article made from methyl methacrylate resin wherein the appearance of the article at the opposite side thereof is greatly improved.

In carrying out the above object, it is a further object in some cases to metallize or otherwise color the surface of the methyl methacrylate resin after application of a tinted appearance enhancing coating whereby the color is modified when viewed from the opposite side and wherein the brilliance thereof is greatly enhanced.

Further objects and advantages of the present invention will be apparent from the following description.

In the manufacture of plastic medallions, such as name plates, horn buttons and similar articles, Intaglio designs are often molded into said ornaments at the back side thereof and are colored by the application of paint, metal, through metal evaporation, etc., whereby the design at the opposite side of the article has the appearance of a metallic medallion or the like. It is often difficult to obtain the exact color desired, particularly when using metal evaporation since it is desirable in most cases to utilize aluminum as the metal to be evaporated due to its low cost and to have said aluminum simulate the color of gold or the like. (Other metals, such as gold, silver, chromium, etc., may be used at greater cost.) In order to do this it is necessary to modify the color of the aluminum through tints applied to the methyl methacrylate in the form of a transparent lacquer to form an intermediate layer. In other words, when an intermediate layer of yellowish color is applied on the plastic and aluminum is evaporated thereon, the appearance of the aluminum at the opposite side of the article simulates gold. Similar startling effects may be obtained by using various dyes and/or pigments in the interposed plastic layer.

This process is preferred since other portions of the article may have colored paint applied wherein it is not at all desirable to tint the entire article but merely that portion upon which the metal is to be evaporated. Furthermore, it is desirable in many cases to back up a plastic article of the general character described with a coating of another plastic wherein the index of the refraction of the two plastics is slightly different whereby a greater brilliance is obtained from the opposite side of the plastic base. This may be explained by the fact that the thin layer of lacquer or plastic, coated on the back surface due to its index, acts to a degree as a reflecting surface and in all cases, the brilliance and sparkle of the plastic per se, is improved.

The majority of the medallions or ornamental plastic articles used today are made from methyl methacrylate resins. So far as we have found there is no completely satisfactory plastic coating on the market for methyl methacrylate resin. Commercial lacquers of which we are aware superficially attack the surface of the resin or otherwise damage its appearance. This superficial attack causes pitting and roughening of the surface which ruins the brilliance of the part and reduces its transparency. We have discovered that a special coating or lacquer that we have compounded may be used on methyl methacrylate resin without pitting or chemically attacking the surface thereof and in fact which coating, greatly enhances the appearance of the surface when viewed from the opposite side. This coating in essence consists of a nitrocellulose base in a mixture of suitable carriers, the lacquer may be applied by spraying, dipping, brushing or other known methods. Specifically, the coating consists of nitrocellulose (60 to 80 viscosity) 1 to 4 parts, acetone 50 to 75 parts, amyl acetate 49 to 21 parts. Coatings or lacquers made within these limits provide satisfactory results. A preferred formula expressed in percent by weight is nitrocellulose (60 to 80 viscosity) 2.5%, acetone 73.8%, amyl acetate 23.7%. In all cases, oil soluble dyes and/or finely dispersed, colloidal pigments may be included to modify the color of the lacquer which remains transparent but which acquires a tint that will modify the appearance of metals subsequently evaporated thereon. It is important that the nitrocellulose used, be within the range of viscosity noted, which viscosity is measured by the standard ASTM method designated "Specification D 301–48." Low viscosity nitrocellulose is not satisfactory for this use.

In general, the coating as applied by spraying is very thin in the order of .0005 to .0020" and such coating may be applied in a single application or may be applied by superimposing several thin coats, one upon the other, to obtain the desired results. The exact thickness of the coating is best arrived at by trial, since it is apparent that specific results will vary in accordance with the quantity of dye and/or pigment and the type of metallic backing to be used.

It is to be understood that the application of the lacquer or coating disclosed herein, while particularly beneficial with respect to articles to be subsequently coated by metal evaporation is in no way limited to such articles and actually improves the appearance of methyl methacrylate resins by enhancing the brilliance thereof when no other material is utilized. Similarly the tinted lacquer alone may be used to tint portions of the methyl methacrylate article as desired.

From the foregoing, it will be apparent that we have discovered a new and useful coating for application to methyl methacrylate resin articles which enhances the surface appearance, improves the brilliance and which, in some cases, may modify the color thereof without, in any way, attacking the methyl methacrylate while forming a strong, adhering layer thereon.

While the embodiments of the present invention as herein disclosed, constitute preferred forms, it is to be understood that other forms might be adopted.

What is claimed is as follows:

1. A transparent coating material for use in connection with articles made from methyl methacrylate resin for enhancing the appearance thereof consisting essentially of nitrocellulose having a 60 to 80 viscosity, 1 to 4 parts, and a solvent consisting of acetone 50 to 75 parts, amyl acetate 49 to 21 parts, said coating being adapted for direct application to the methyl methacrylate.

2. A coating material for use in connection with articles made from methyl methacrylate resin consisting essentially of nitrocellulose having a 60 to 80 viscosity, 2.5%, acetone 73.8% and amyl acetate 23.7%, said coating being adapted for direct application to the methyl methacrylate.

3. A coating material for use in connection with articles made from methyl methacrylate resin consisting essentially of nitrocellulose having a 60 to 80 viscosity, 2.5 parts, acetone 73.8 parts and amyl acetate 23.7 parts, together with small quantites of a color modifying dye, said coating being adapted for direct application to the methyl methacrylate.

4. A new article of manufacture comprising a laminated structure consisting of a relatively thick layer of methyl methacrylate resin having one surface exposed to direct view and another surface normally out of view, and a relatively thin layer of a lacquer applied to said other surface, said lacquer originally consisting of nitrocellulose (60 to 80 viscosity) 2½%, acetone 73.8% and amyl acetate 23.7%, said thin lacquer layer enhancing the appearance of the methyl methacrylate at the exposed surface thereof.

5. A new article of manufacture comprising a laminated structure consisting of a relatively thick layer of methyl methacrylate resin having one surface exposed to direct view and another surface normally out of view, and a relatively thin layer of a lacquer applied to said other surface, said lacquer originally consisting of nitrocellulose (60 to 80 viscosity) 2½ parts, acetone 73.8 parts and amyl acetate 23.7 parts, together with small quantities of a color modifying dye, said thin layer enhancing the appearance of the methyl methacrylate at the exposed surface thereof.

References Cited in the file of this patent

UNITED STATES PATENTS

| Number | Name | Date |
|--------|------|------|
| 894,108 | Bethisy | July 21, 1908 |
| 1,122,554 | Tessler | Dec. 29, 1914 |
| 1,523,814 | Lindsay | Jan. 20, 1925 |
| 2,464,143 | Martinson | Mar. 8, 1949 |

FOREIGN PATENTS

| Number | Country | Date |
|--------|---------|------|
| 586,105 | France | Mar. 16, 1925 |
| 258,698 | Great Britain | Sept. 30, 1926 |
| 492,985 | Great Britain | Sept. 30, 1938 |

OTHER REFERENCES

Halls, "Lacquer for Use Preliminary to Metal Spraying," article in Paint Technology, January 1939, pages 28 and 36.

"Nitrocellulose," Hercules Powder Co., Wilmington, Delaware (1944), pages 6–9.